Dec. 20, 1927.
J. L. DRAKE
1,653,040
MIRROR
Filed April 30, 1926
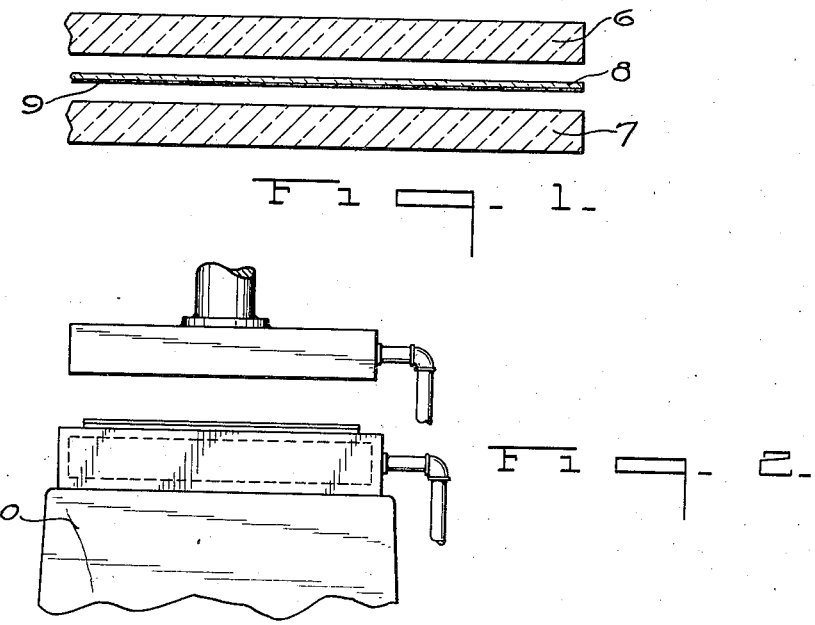
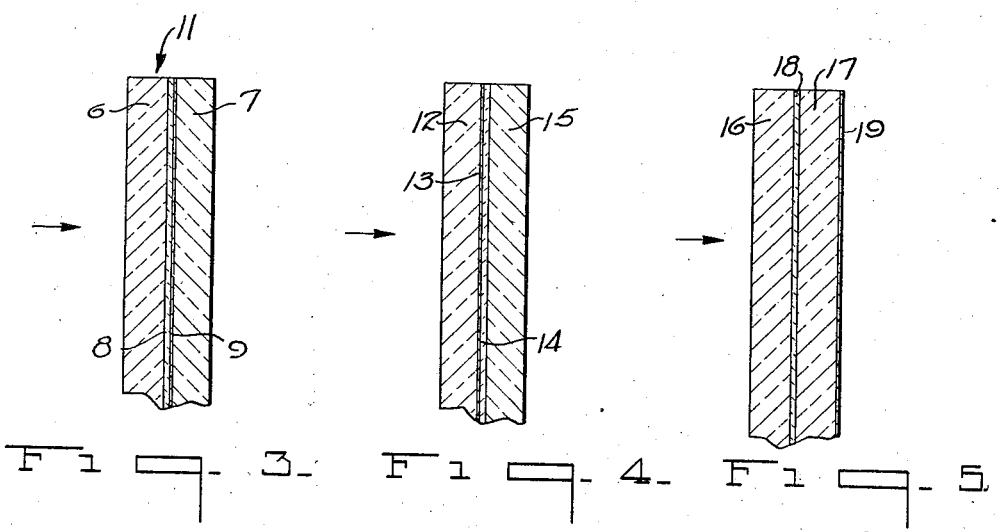
Inventor
John L. Drake.
By Frank Fraser,
Attorney Patented Dec. 20, 1927.

1,653,040

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

MIRROR.

Application filed April 30, 1926. Serial No. 105,623.

The present invention relates to mirrors, and to the process of producing the same.

An important object of the invention is to produce a mirror which will not shatter if subjected to a severe shock.

Another important object of the invention is to produce a mirror by laminating a plurality of sheets of glass and a sheet of non-brittle material, one of the laminations being properly silvered to produce a mirror.

Still another object of the invention is to provide a process for producing a mirror, consisting in uniting a plurality of sheets of glass and a sheet of non-brittle material, one of the sheets being covered with a suitable silvering material, either before or after they have been united.

Other objects and advantages of the invention will become apparent during the course of the following description.

In the drawings wherein like numerals are employed to designate like parts throughout the same, Fig. 1 is a sectional view showing the laminations before they are united, the non-brittle material having a coating thereon, Fig. 2 is a diagrammatic representation of a form of press which may be used to unite the laminations, and Figs. 3, 4 and 5 are sectional views of various forms of the finished product.

In accordance with the present invention, a mirror is formed by uniting a plurality of sheets of material to form what is known in the art as laminated glass, one of the laminations, comprising the finished sheet, being coated with a suitable silvering material.

In Fig. 1, the numerals 6 and 7 designate two sheets of preferably transparent glass, while the numeral 8 designates a sheet of non-brittle material such as a cellulose composition material. In the form shown in Fig. 1, the non-brittle sheet of material 8 is provided with a coating 9 of some silvering material such as quick silver or the like. Ordinarily, in the production of mirrors, the manufacturer makes his own mixture so that quick silver is mentioned by way of example only, and is not to be taken as a term of limitation. In other words, any material which will produce a suitable reflecting surface is included in the present invention.

After the sheet of non-brittle material 8 has been suitably coated, as shown in Fig. 1, the laminations are united in accordance with any of the well known processes of forming laminated glass. Ordinarily, some form of binder is interposed between the laminations to insure a good union when subjected to the action of heat and pressure. The heat and pressure may be applied to the laminations by means of a heated press 10 shown in Fig. 2.

In Fig. 3 is shown the finished sheet as formed in accordance with the illustration in Fig. 1, the arrow indicating the front of the finished mirror 11. In Fig. 4 the front sheet 12 is provided with the coating 13 instead of the non-brittle sheet as in Fig. 1. To produce a mirror as shown in Fig. 4, the sheet 12 is silvered, after which the silvered surface is placed in contact with the non-brittle sheet 14 or a binder between the two, and together with the sheet of glass 15, united. In the mirrors shown in Figs. 3 and 4, the two back sheets, namely, 7 in Fig. 3, and 15 in Fig. 4, need not necessarily be a high grade sheet, as this sheet is not seen and will not cause distortion. In both of the forms shown in Figs. 3 and 4, one of the laminations is treated with a suitable silvering material before the various laminations are united. In Fig. 5 a sheet of laminated glass, comprising two sheets of glass 16 and 17, are united with a sheet of non-brittle material 18 interposed therebetween. After these three laminations have been combined, the exposed surface of the sheet 17 is given a suitable coating 19. A mirror formed in accordance with the present invention may become broken due to a severe shock, but the glass will not scatter as the non-brittle sheet of material interposed between the glass sheets will retain the fragments of glass even if they are broken. Of course a mirror formed in this manner will stand a much greater shock or blow than the ordinary mirror before it will become fractured.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. As a new article of manufacture, a mirror formed from a plurality of sheets of glass and a sheet of non-brittle material.

2. As a new article of manufacture, a mirror formed from a plurality of sheets of glass and a sheet of non-brittle material, one of said sheets being silvered before it is united with the other sheets.

3. As a new article of manufacture, a mirror formed from a plurality of sheets of glass and a sheet of non-brittle material, one of said sheets being silvered.

Signed at Toledo, in the county of Lucas, and State of Ohio, this 28th day of April, 1926.

JOHN L. DRAKE.